United States Patent [19]

Johnson et al.

[11] Patent Number: 4,890,781

[45] Date of Patent: Jan. 2, 1990

[54] AUTOMATED FLOW SOLDER MACHINE

[75] Inventors: Paul B. Johnson, Plano, Tex.; Robert F. Mininger, Johnson City, Tenn.; Steven R. Lane, Tucker; Edwin Lamb, Lilburn, both of Ga.

[73] Assignee: Texas Instruments Incorporated, Dallas, Tex.

[21] Appl. No.: 228,906

[22] Filed: Aug. 4, 1988

[51] Int. Cl.[4] .................. B23K 3/04; H05K 3/34; H05B 7/16

[52] U.S. Cl. .................. 228/7; 228/8; 228/9; 228/11; 228/37; 228/20

[58] Field of Search .............. 228/102, 103, 104, 207, 228/7–11, 37, 20

[56] References Cited

U.S. PATENT DOCUMENTS

| | | | |
|---|---|---|---|
| 4,363,434 | 12/1982 | Flury | 228/7 |
| 4,632,291 | 12/1986 | Rahn et al. | 228/9 |
| 4,698,774 | 10/1987 | Abe et al. | 228/9 |
| 4,708,281 | 11/1987 | Nelson et al. | 228/20 |
| 4,775,776 | 10/1988 | Rahn et al. | 228/9 |

FOREIGN PATENT DOCUMENTS

| | | | |
|---|---|---|---|
| 227360 | 9/1985 | German Democratic Rep. | 228/37 |
| 193760 | 11/1984 | Japan | 228/8 |
| 257966 | 12/1985 | Japan | 228/8 |
| 49772 | 3/1986 | Japan | 228/7 |
| 199266 | 9/1987 | Japan | 228/11 |

Primary Examiner—Richard K. Seidel
Assistant Examiner—Samuel M. Heinrich
Attorney, Agent, or Firm—B. Peter Barndt; James T. Comfort; Melvin Sharp

[57] ABSTRACT

A computer controlled flow solder machine is controlled by a computer, operating in conjunction with two other computers, to control the operation of the machine and to control and monitor the process parameters for each circuit board processed through the flow solder machine. The flow solder machine is made up of a conveyer system, a flux system, a preheat system, and a solder pot system.

53 Claims, 8 Drawing Sheets

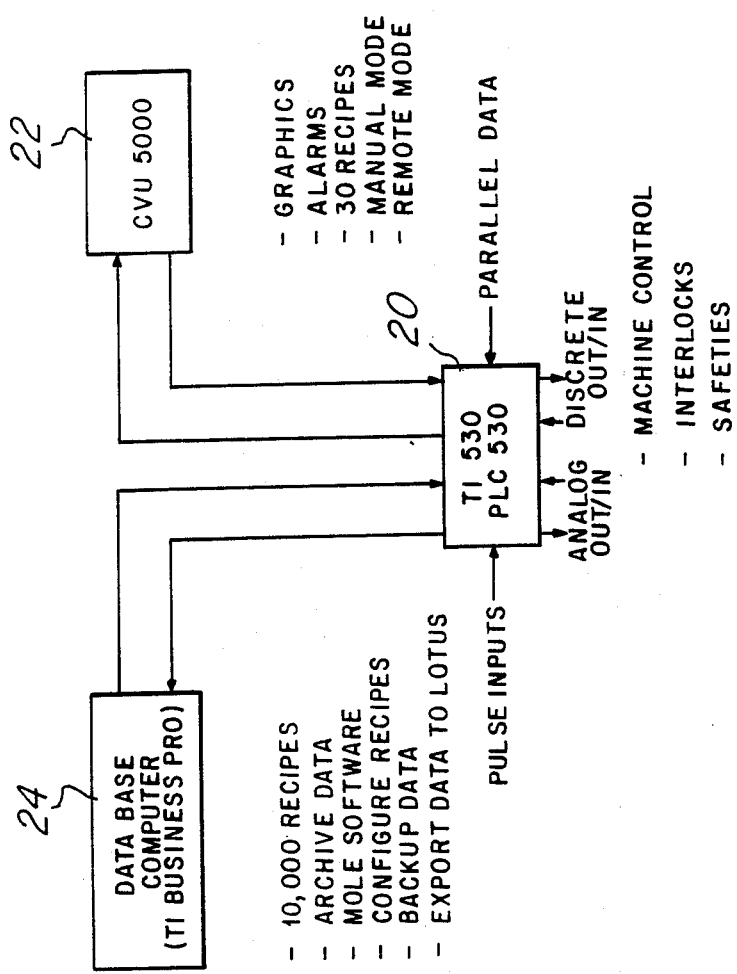

AUTOMATED FLOW SOLDER MACHINE

FIELD OF THE INVENTION

This invention relates to flow solder machines, and more particularly to a computer controlled flow solder machine that controls each stage in the process of flow soldering circuit boards and performs quality control through data maintenance.

BACKGROUND OF THE INVENTION

Flow soldering can easily be justified as the single most important process in the manufacturing of printed wiring assemblies. If the flow solder process is not adequately controlled, a large number of touch-up operators have to be employed to rework the defects of the flow solder process. The flow solder process in most cases is operator dependent, therefore the challenge is how to gain better control of the flow solder process.

There are other computer controlled flow solder machines, but these computers automate the machine, not the process. For example, they control the solder immersion depth by simply changing the solder pump speed. This method ruins the wave profile in which great care was used to obtain the optimum wave profile, where the solder just falls off the backgate of the solder pot.

To reduce solder defects, control of the flux applied to the circuit board is critical, and control of the flux application is critical. It has been found that not only should flux be applied to the etch side of the printed circuit board by a flux wave, but flux defects are greatly reduced by applying flux to the topside by use of top side flux guns. Also critical to the flow solder process is the preheating of the printed circuit board. Preheating of the printed circuit board is done to drive off the carrier solvent of the flux, to reduce thermal shock, and to activate the flux. It is important that the preheat be consistent and controlled so that repeatable results can be obtained.

To have overall good soldering, the speed of travel of the printed circuit board, the amount of flux applied, the amount of preheat, the depth into the solder wave by the circuit board, and the dwell time of the board in the solder wave all must be considered and correlated to ensure proper soldering of the circuit board. In prior flow solder machines, the parameters are set manually and not necessarily changed for each board type, or the machine is automated, but not the process.

SUMMARY OF THE INVENTION

The flow solder machine of the present invention includes three computers. The first computer, for example may be a Texas Instruments Inc. PLC (programmable logic controller) 530 controller. This computer controls all the machine functions, interlocks, and safeties. This computer also controls the machine via pulse inputs, analog outputs/inputs, discrete output/inputs, and parallel data.

The second computer is, for example, a Texas Instruments Inc. CVU 5000 computer interface. This computer displays animated computer graphics, alarm conditions and locations, and machine status. From this computer up to 30 unique recipes (profiles) can be sent to the PLC 530 controller. The flow solder machine can be operated in a manual mode (turn certain functions on/off), and remote mode, running the machine from the data base computer.

The third computer is a database computer which is, for example, a Texas Instruments Inc. Business Pro (AT compatible). From this computer up to 10,000 unique recipes (profiles) can be sent to the PLC 530 controller, the actual flow solder conditions for each fixture recorded, new recipes configured, Mole software can be used, configuration and archive data exported to Lotus 123, and data files backed up.

These three computers work together in the following manner. First, for each unique printed circuit board a recipe is written on the database computer. This recipe includes the set points and the alarm tolerances for the printed circuit board. The recipe is then downloaded to the PLC 530. Once startup is initiated the PLC 530 will then setup the machine according to the set points and tolerances specified in the recipe. If an out-of-tolerance condition occurs, the PLC 530 notifies the CVU 5000 and the CVU 5000 then displays the alarm. Depending on how critical the alarm is (i.e. preheat out-of-tolerance, solder pot temperature, conveyer speed out-of-tolerance, etc.), the PLC may shutdown the entire process except for the conveyer drive if there is a product in the machine. Otherwise, the alarm is simply displayed on the CVU 5000 notifying the operator what corrective action is needed (i.e. alcohol reservoir low, flux reservoir low, solder wire feeder disabled, etc.).

Also displayed with the CVU 5000 are the animated graphics. The CVU 5000 looks to see what machine functions are on/off and will display the appropriate graphic.

In operation, a recipe is down loaded from the third computer to the first computer. The first computer then controls the machine functions based on the recipe. If the machine goes out of tolerance, the alarm locations and status are displayed on the second computer on a graphics screen. During operation the first computer sends flow solder conditions data back to the third data base computer. At the end of the day or production run, the archive data is exported to a worksheet, and the data base files are backed up.

In addition to the overall system described above, the invention defines three major subsystems within the flow solder machine: a flux system; a preheat system; and a solder system.

The flux system includes a flux wave which is applied to the bottom of the circuit board, and flux is applied to the top of the board by a spray. A sensor detects the flux wave height to maintain the flux wave at a desired level, and a sensor is used to monitor flux density. Air knives are used to remove excess flux from the top and bottom of the circuit board.

The preheat system uses seven zones of IR preheat tubes with six tubes for each zone. The IR preheat tubes are perpendicular to the board conveyor. The preheat systems uses closed loop feedback control, and a thermal couple is mounted in each zone with temperature feedback to the PLC. The temperature of the top side of the circuit board is monitored using an automatic positioning pyrometer.

The solder system uses solder lever probes and a Kaman capacitance probe to control the solder wave height relative to the printed circuit board being soldered. Solder pump speed is controlled to help maintain solder wave height.

The circuit board conveyor uses a tachometer and an encoder with cascade control for speed control of the conveyor system.

Animated graphics is used to indicate operating parameters of the flow solder machine and to depict the location of each printed circuit board in the flow solder machine.

The technical advance represented by the invention as well as the objects thereof will become apparent from the following description of a preferred embodiment of the invention when considered in conjunction with the accompanying drawings, and the novel features set forth in the appended claims.

BRIEF DESCRIPTION OF THE DRAWINGS

FIG. 2 is a block diagram of the computer interconnection of the flow solder machine;

DESCRIPTION OF A PREFERRED EMBODIMENT

Figure 1:
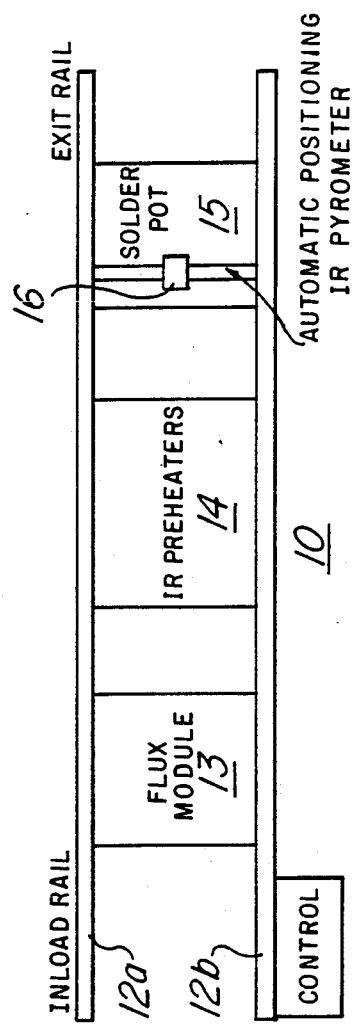
FIG. 1 is a simple block representation of the flow solder machine.

FIG. 1 illustrates a simplified drawing of the wave solder machine and its basic modules. Flow solder machine 10 is equipped with in-load rails 12a and 12b onto which circuit board to be flow soldered are placed. The circuit boards are carried by rails 12a and 12b to flux module 13 where flux is applied by spraying the top of the printed circuit board and applied to the bottom of each printed circuit board by passing the board through a flux wave. The circuit boards are then carried over IR preheaters 14 to elevate the temperature of each board to a temperature at which flux carrier solvent is driven off; thermal shock reduced; and the flux is activated.

After the circuit board is brought to proper preheat temperature, the board passes over the solder pot 15 to receive solder. The board is then carried out of the flow solder machine by the exit rails.

An automatic positioning IR pyrometer is used to measure the top side board temperature.

Figure 1A:
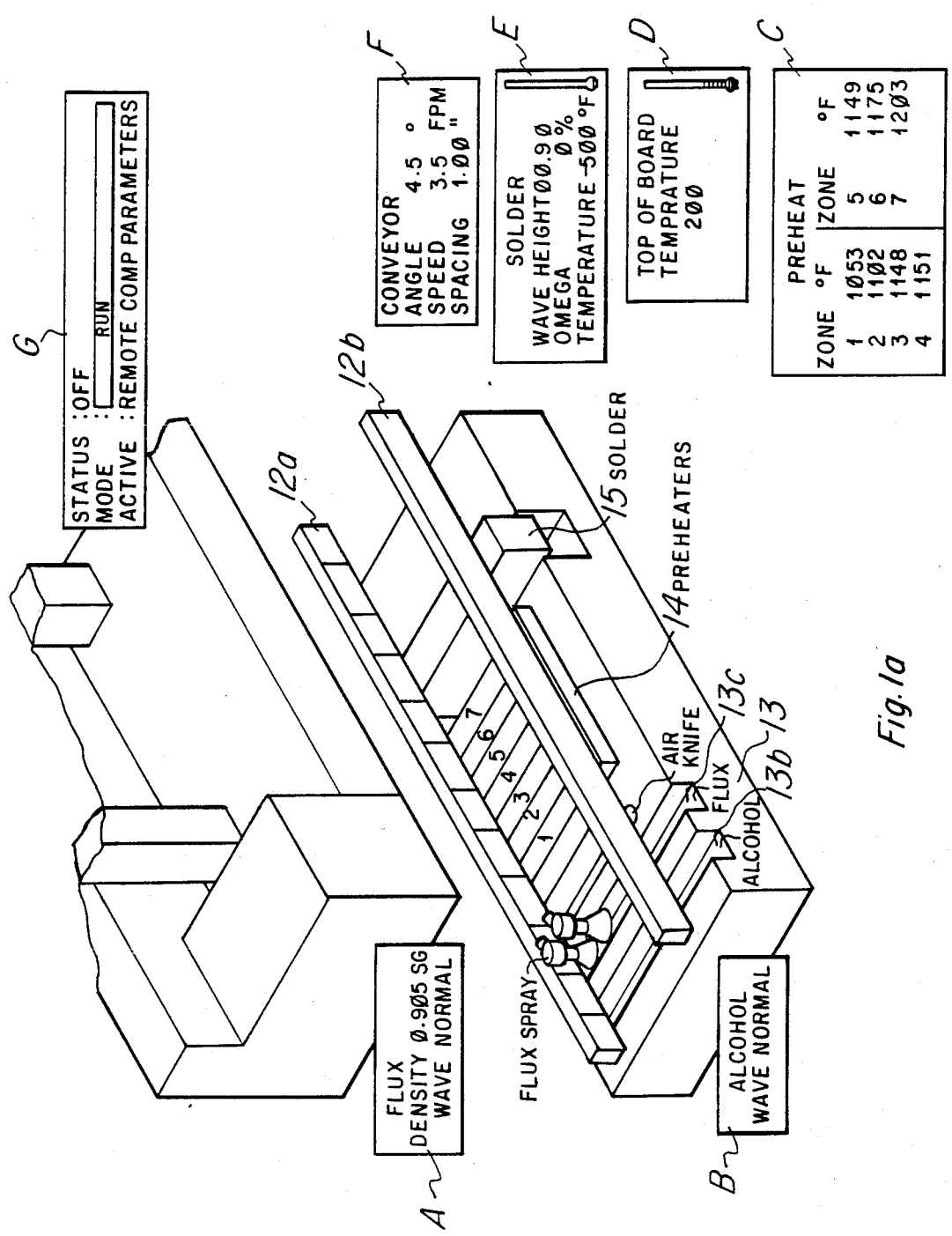
FIG. 1a is an animated graphic illustration of the flow solder machine.

FIG. 1a is an animated graphic display of the overall flow solder machine. The machine operator can view the overall machine/process parameters from the graphic screen of FIG. 1a. The two rails 12a and 12b are illustrated. The flux unit 13 includes the "ALCOHOL" and "FLUX" waves 13b and 13c and the "FLUX SPRAY" units. The preheater 14 includes the seven preheat zones. Solder system 15 is shown.

FIG. 1a also contains display boxes A through F which display typical or possible operating parameters of the wave solder machine. The numbers in the display boxes are indicative of operating parameters for a particular circuit board being processed, but these numbers may change depending on the operating parameters the particular circuit board to be processed through the flow solder machine.

Flux density is displayed in box A with the status of the flux wave, which is normal. Box B indicates that the status of the alcohol wave is normal. Box C displays the temperature of each of the seven zones. Box D displays top of board temperature. Box E displays solder and solder wave information. Box F displays conveyer information, and Box G is indicative of over all machine status.

The control for the system is accomplished with a network of three computers. The interconnection of the computers is illustrated in FIG. 2.

FIG. 2 illustrates the interconnection of the three computer/controllers for the flow solder machine. The first computer/controller 20 is, for example, a Texas Instrument PLC (programmable logic controller) 530. This computer/controller controls the flow solder machine via pulse inputs, analog outputs, discrete output/inputs, and parallel data from the various sensors, and data output devices on the flow solder machine. Inputs are also received from two other computers as illustrated.

The second computer 22 is, for example, a Texas Instruments CVU 5000 computer interface. This computer displays animated computer graphics, alarm conditions and locations, and machine status. From this computer up to 30 different unique recipes (or profiles) of 30 different circuit boards can be sent to the PLC 530 controller.

The third computer 24 illustrated is a data base computer, for example, a Texas Instruments Business Pro Computer. This computer can store up to 10,000 unique recipes (profiles) which can be sent to the PLC controller. With data received by the PLC 530 controller and sent to the third computer, the actual flow solder conditions for each circuit board processed through the machine can be recorded.

New recipes can be configured on the third computer and stored for present and future use. Archived and recipe data files can be backed up and stored on the third computer and can be exported to a spreadsheet, for example Lotus 123. These backed up data files can be printed out by use of database software or on a Lotus 123 worksheet.

The flow solder machine may be run in a manual mode with certain functions either on or off. Also the flow solder machine may be operated remotely from the third computer 24.

In operation, a unique recipe is down loaded from the data base computer 24 to the PLC 530 controller 20. The PLC 530 controller 20 then controls the flow solder machine functions based upon the unique recipe.

During operation, if the machine goes out of tolerance, alarm locations and status are displayed on the CVU 5000 interface 22. These displays are in animated graphics, displaying an animated representation of the malfunction or out of tolerance part of the machine. The machine attendant may then correct the reason for the alarm, placing the machine in proper operating condition.

During operation, actual flow solder conditions are sent to the data base computer 24, keeping statistical records on each circuit board processed through the flow solder machine.

At the end of each day or shift of operation of the flow solder machine, the archived data can be backed up and saved to disk. These files can then be printed out using the database software or exported to, for example, a LOTUS 123 worksheet.

In describing the flow solder machine, it may be divided into three major systems: the Flux system; the Preheat System; and the Solder Pot System.

Prior to the application of flux, an alcohol wave (see FIG. 1a, part 13) is utilized to remove contaminants such as finger oils.

Figure 3:
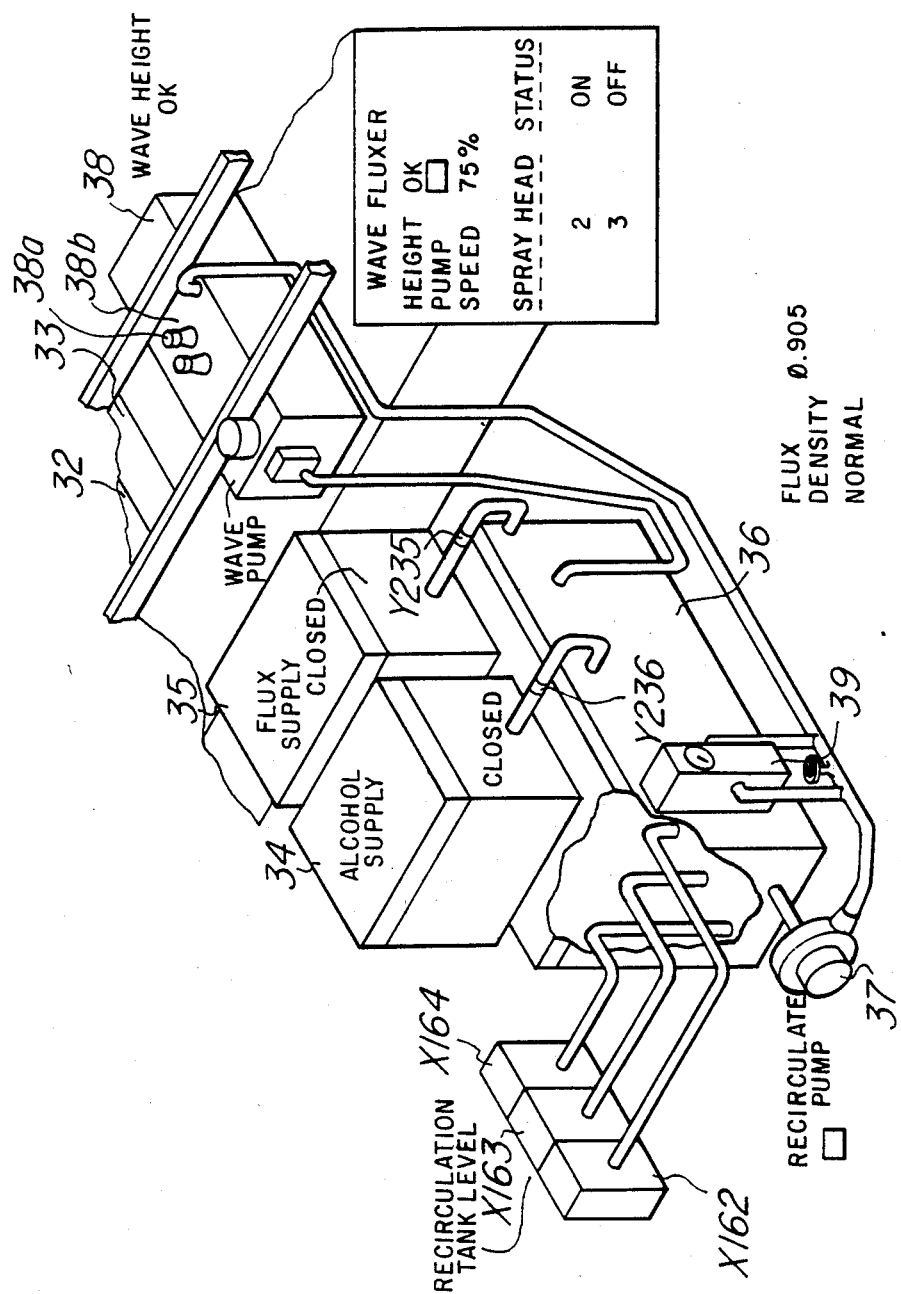
FIG. 3 is a diagram of the Flux System.

One of the main factors in flow soldering successfully is to have a proper application of flux. FIG. 3 illustrates the flux system 30, and is a representation of a video control panel animated color graphic screen displayed on the operator console. The numbers in the boxes of FIG. 3 are indicative of actual operating parameters, for a particular process, but may be different for other processes. This statement also applies for the boxes in FIGS. 5 and 6 discussed below. In the present system, a standard electrovert wave fluxer is used to apply a rosin activated flux to the bottom of the printed circuit board, and top side sprayers 38a are used to spray flux on the top of the printed circuit board. The height of the flux wave is monitored to ensure that the flux mixture is being applied to the bottom of the circuit board being processed. One air switch sensor (not illustrated) placed to the side of the wave constantly checks to determine if the wave 38b is at a minimum height. After the wave and topside flux sprayers 38a apply flux to the circuit board, the board is passed over air knives 32 and 33. Top air knife 32 and bottom air knife 33 knives blow the excess flux off the board as well as blowing flux through the holes in the board so the holes can be soldered all the way through.

The air knives 32 and 33 are turned on when the system is enabled. A solenoid is activated by an output module from the programmable controller for each air knife. Air knife pressure is monitored by a pressure switch (not illustrated) that verifies that there is actual pressure through the air knife and that the supply of air has not been turned off, or that the solenoid is not burned out.

This safety check is performed because there is a potential for fire if excess flux is allowed to drip off the bottom of the boards onto the preheat tubes.

Flux density is controlled in this system. Two supply reservoirs 34 and 35 are used. One reservoir 35 contains flux and the other reservoir contains 34 thinner (alcohol). There is a mixing reservoir 36, and recirculation pump 37 which pumps a flux and alcohol mixture from the mixing reservoir into the electrovert main flux reservoir 38 and back into the mixture reservoir 36. As the mixture is recirculating, a continuous sample is pumped through a Princo flux density monitor 39. The flux density monitor sends a signal to the programmable controller where any deviation from a set point is calculated. The programmable controller then adds, by momentarily opening valves Y235 or Y236, appropriate amounts of either flux or thinner to bring the mixture to the density specified in the recipe.

The level of the flux mixture is controlled in the reservoir by three air switches X162, X163 and X164. Two of the switches X162 and X164 serve as high and low switches. Both are alarm switches. The third switch X163 is a "normal" switch. When the mixture in the reservoir drops below the normal switch X163, but not to the low switch X162, an appropriate mixture of both flux and thinner is added.

Air switches X162, X163 and X164 are used in the system because they are extremely reliable and there is no danger of catching the alcohol on fire. The air switches are connected to a 120 volt input module of the programmable controller.

Figure 4:
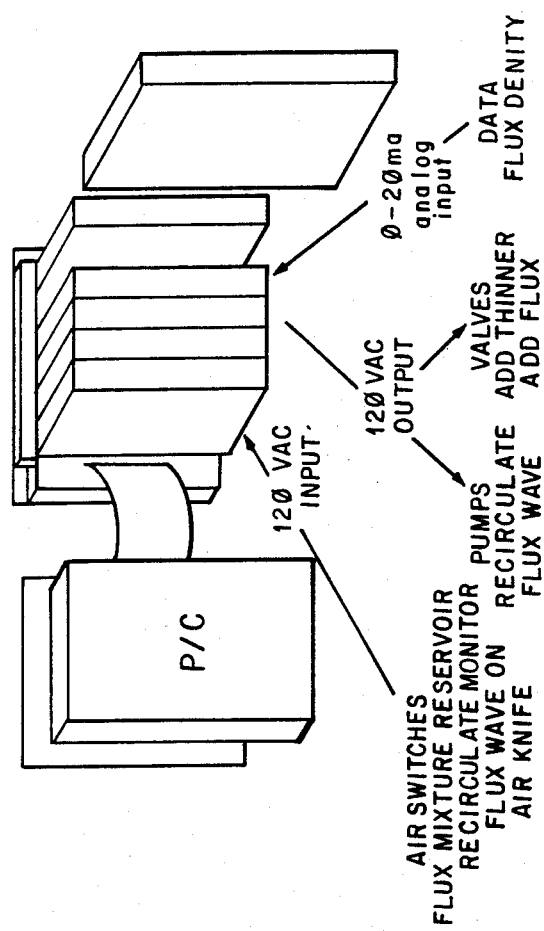
FIG. 4 is drawing representing the Flux System Control hardware.

FIG. 4 illustrates the control hardware used to control the flux system, interfacing the flow solder machine with the program controller.

Figure 5:
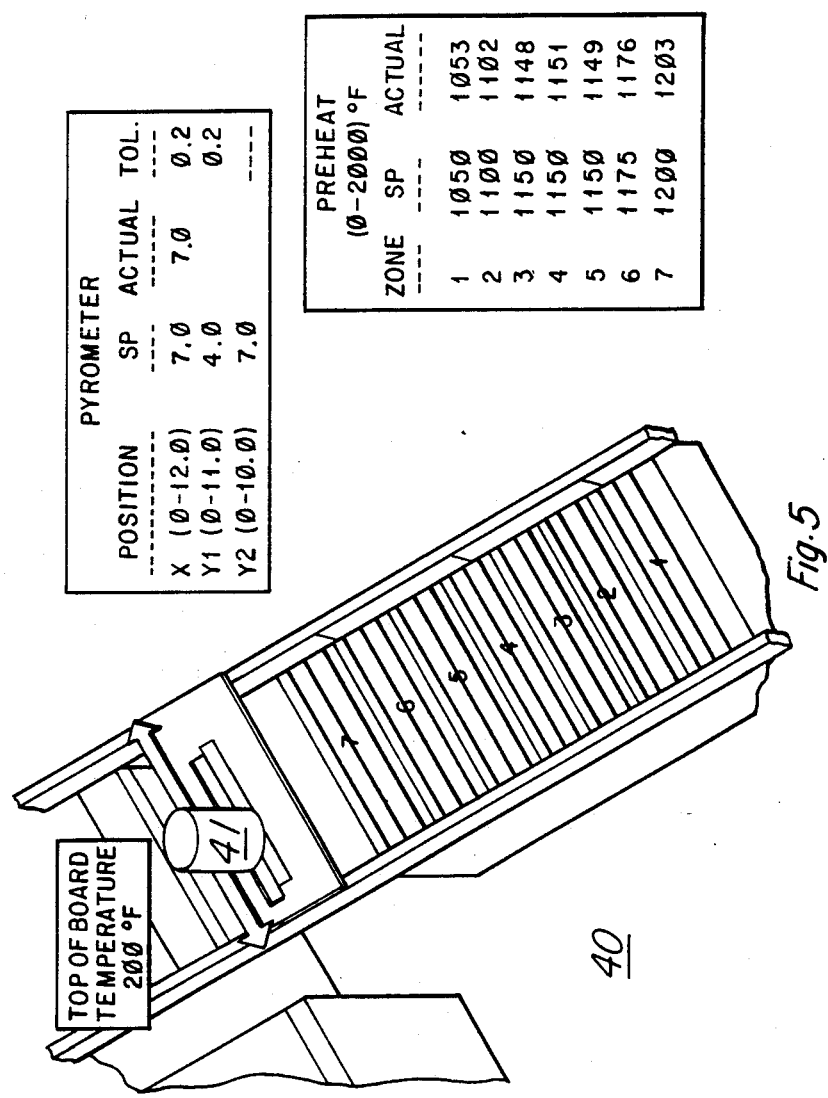
FIG. 5 is a drawing of the Preheat System.

Following the Flux system is the Preheat System. The Preheat System 40 is illustrated in FIG. 5. This illustration of the Preheat System is as viewed on the video monitor display at the control station.

The preheat system consists of seven zones which are controlled individually via closed-loop feedback. Each zone consists of 6 infrared tubes which are perpendicular to the conveyer rail with a thermocouple inside one of the tubes in each zone. The temperature for each zone is continuously monitored by an SCR controller. This closed loop feedback system was chosen over other systems which use an infrared pyrometer to control the last zone of preheat. The infrared pyrometer control type system has been found to be quite unreliable since the infrared pyrometer depends on the emissivity of the printed circuit board. Therefore for best results, the printed circuit board should be made up all of the same material, which is not possible, since the top of the printed circuit board can be made up of FR-4 (epoxy), Aluminum, Sn/Pb solder, ceramic, etc. During calibration most infrared pyrometers are accurate to only +/− 3° F. looking at a black body.

The present system controls the amount of preheat going into each printed circuit board through a closed loop feedback system. To monitor the topside board temperature, an automatic positioning pyrometer 41 is utilized. This pyrometer is positioned to within +/− 0.1" using a 3 coordinate system. In this system a length of printed circuit board is scanned and an average topside printed circuit board temperature is calculated. The topside printed circuit board temperature is then corrected using a correction factor which is determined from profiling the printed circuit board with thermocouples. This correction factor is used because it is not feasible to determine the emissivity of the printed circuit board since most printed circuit boards are made up of FR-4 (epoxy) ceramic, Sn/Pb ground planes, aluminum thermal planes, etc. The important point is that in the present system, the pyrometer monitors the topside printed circuit board temperature, it does not control it.

FIG. 5 also has two boxes, one captioned "PYROMETER" that indicates the location of pyrometer 41, and the other box captioned "PREHEAT" to indicate the temperature of each of the preheat zones.

Figure 6:
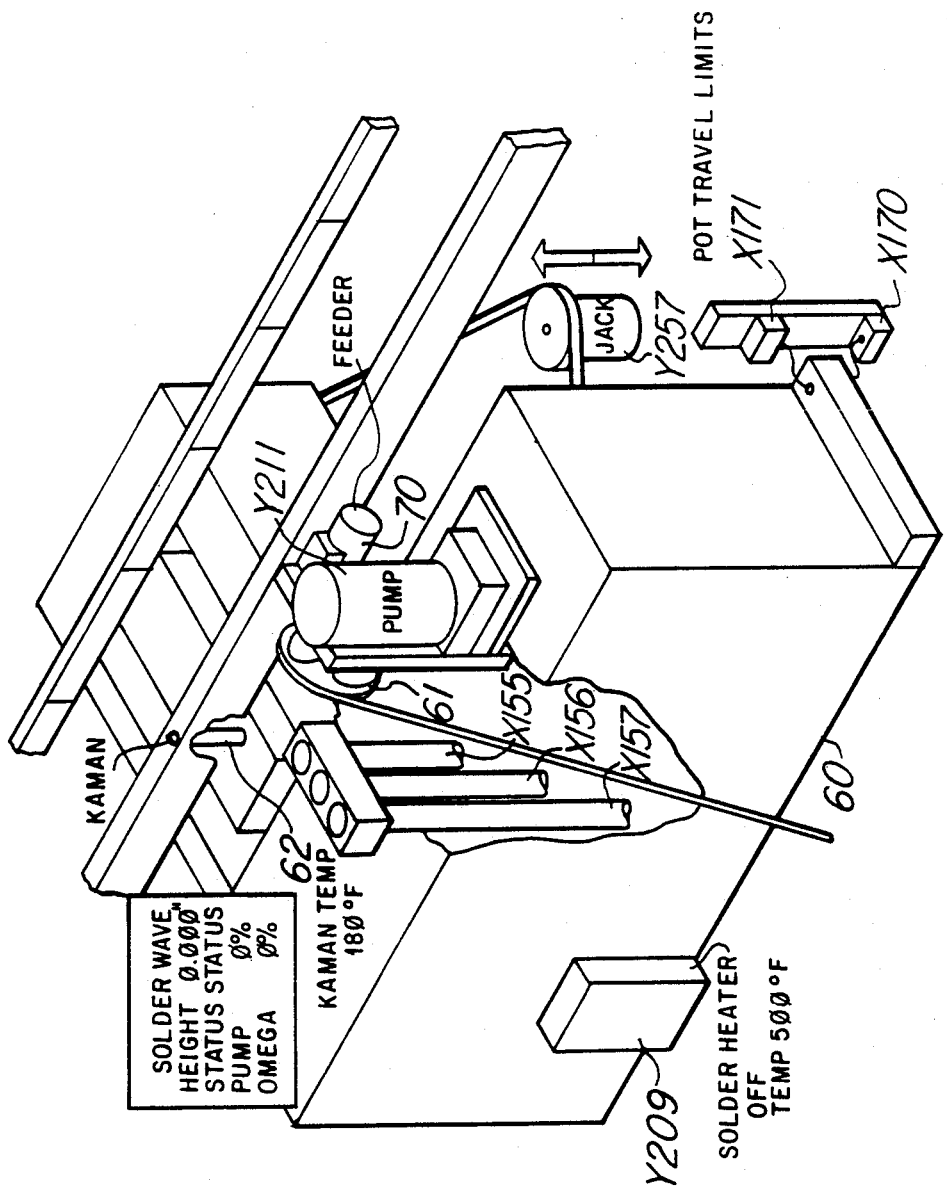
FIG. 6 illustrates the Solder System.

FIG. 6 illustrates the Solder Pot System 60 as it is displayed on the operator's video monitor.

The soldering system is the most important, thus the most intricate. This system contains solder level sensors X155, X156 and X157, automatic solder make-up 61, printed circuit board immersion solder depth control 62, percent pump speed control Y211, and temperature control Y209. In other computer control flow solder machines, the solder immersion depth control is controlled by simply changing the percent pump speed. This is indicative of automating the machine and not the process because the wave profile does not remain constant when the pump speed is changed. Typically, great care is taken in adjusting the backplate, front gate, and nozzle when setting up the optimum wave profile. In order to keep an optimum wave profile and be able to vary the solder immersion depth automatically, the following method is used. First the optimum wave profile is maintained by keeping the amount of solder in the pot constant by use of solder level sensors (X155 high, X156 normal, X157 high), and an automatic solder wire feeder 70, and by keeping a constant solder pump speed. Finally, to adjust the immersion depth, a Kaman Capacitance Probe 62 is used to measure the top surface of the solder wave.

The Kaman Capacitance Probe 62 is a non-contact instrument that converts the distance from the sensor to a conductive surface into an analog output. The instrument used on this machine must be within 1" to get a reading. In tests performed with this instrument using a micrometer, the accuracy was found to be +/− 0.005".

To adjust the solder immersion depth, the entire 1500 lb. solder pot is moved using jack stand motor Y257 to move the top surface of the solder wave to a known position based on the Kaman reading. In other words, the solder immersion depth is simply controlled by moving the solder pot up or down based on the Kaman reading.

This is a major improvement over the manual method where the operator views the wave height and then adjusts the solder pot height, or over the method used by other computer control flow solder machines where the wave height is adjusted by solder pump speed.

The solder pot height is adjusted by jack Y257, the movement of which is confined by the limit switches X171 and X170.

Another benefit of reading the top surface of the wave is that even though great care is taken to have the same optimum wave profile, the actual maximum solder depth (at fixed pump speed) on the nozzle changes to some degree after periodic cleanings. This is because of the seating of the nozzle, the gasket, and the amount of dross build-up internally. For example, after one cleaning, the maximum solder depth (at a fixed pump speed) may be at 0.65", but after the next cleaning (where the nozzle is pulled out and the pot is dedrossed), the maximum solder depth may be 0.50". This change makes no difference to the Kaman because it is reading the top surface of the wave, the maximum lead length of a circuit board is reduced form 0.65" to 0.50".

In some printed circuit board applications, the leads are prepped, for example, to a maximum of 0.40". Therefore a maximum solder depth of 0.6 +/− 0.20 inches is maintained. Also controlled in the solder pot system is the solder pot temperature. This is controlled by use of a thermocouple and turning the relays for the heaters on/off around a specified set point and control deadbands to maintain the solder pot temperature in tolerance.

The solder temperature is controlled by the programmable controller 20 activating a contactor for solder pot heaters Y209. Simple on/off control is all that is necessary to keep the 1500 lbs of solder mass to within 5 degrees of the setpoint entered on the video control panel. A J type thermocouple is used to monitor the solder temperature.

The solder pump Y211 is controlled by the programmable controller discrete output module and the analog output module. The discrete output module turns the pump on/off and the analog output module controls the percent pump speed. The pump is not activated until the solder has reached 460 degrees fahrenheit.

FIG. 5 also display a box captioned "SOLDER WAVE" which indicates the wave height and pump status.

Figure 7:
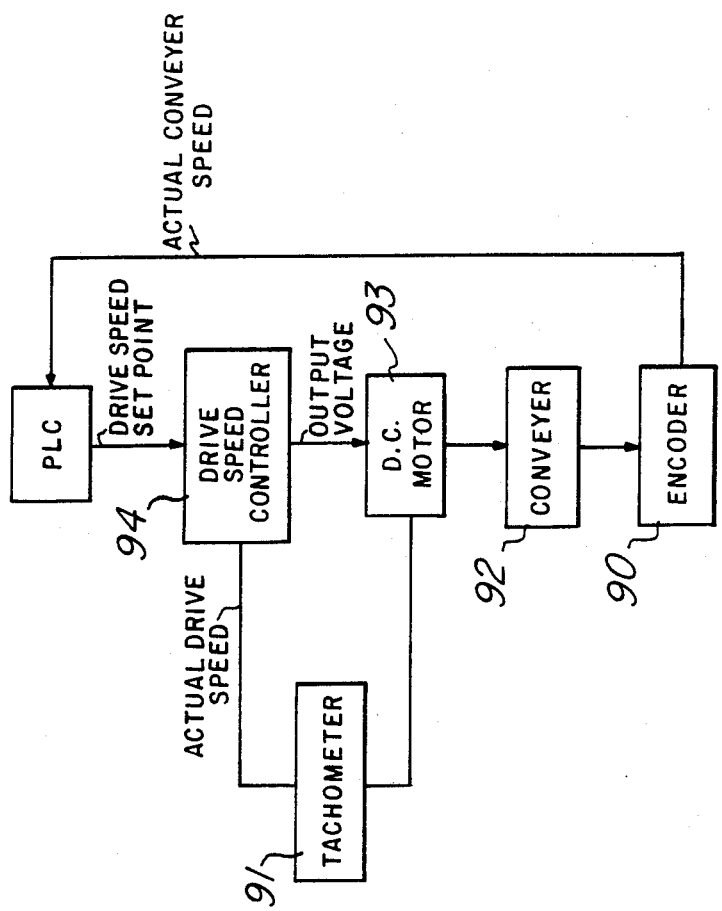
FIG. 7 is a block diagram of the conveyer control system.

In order to achieve the conveyer speed tolerances of 5% error from the selected conveyer speed, an encoder 90, DC drive controller 94, and tachometer 91 are employed using cascading control, see FIG. 7. The tachometer 91 is used to measure the rpm of the DC motor 93. The DC drive controller then compares the drive speed set point with the actual drive speed (measured by tachometer) and then adjusts accordingly. Because you lose resolution measuring conveyer speed from the speed of the DC motor due to gear reducers and chain, an encoder 90 is used to measure the actual conveyer speed. The actual conveyer speed is then sent to the PLC (programmable logic controller) where the PLC compares this value with the conveyer speed set point (from data base computer). The PLC then compensates for error by readjusting the drive speed set point and then sends this value via analog output to the DC drive controller 94.

The significant improvements of the present invention over other computer control flow solder machines is the capability of up to 10,000 unique part number settings, capability of recording the actual flow solder conditions for each fixture soldered, automatic topside fluxing, and improved immersion solder depth control. The present invention is capable of controlling the flow solder process itself and is able to optimize each printed circuit board individually.

What is claimed:

1. A computer controlled flow solder machine for applying solder to printed circuit boards, comprising, at least one computer for controlling the flow solder machine and its process parameters, a flux system for applying flux to two sides of the printed circuit boards processed through the flow solder machine, a preheat system for preheating the printed circuit boards, including a plurality of heating zones, each zone having one or more heating tubes, and each zone including a thermocouple within a closed-loop feedback temperature control system, and an automatic positioning pyrometer to measure the temperature of the topside of each circuit board, a solder system including a solder pot for applying solder to the printed circuit boards, and a conveyor system for moving printed circuit boards through the flow solder machine.

2. The flow solder machine according to claim 1, wherein said flux system includes a flux wave, a non-contact sensor to detect flux wave height, and at least one flux sprayer for applying flux to the top side of the printed circuit boards being processed through the flow solder machine.

3. The flow solder machine according to claim 1, wherein said flux system includes a mixing system for preparing flux to a desired density, and a circulation system for circulating flux through the flux system.

4. The flow solder machine according to claim 2, including a sensor for determining flux wave height.

5. The flow solder machine according to claim 2, wherein said flux system includes a mixing tank for preparing flux to a desired density, and means for determining the flux level in the mixing tank.

6. The flow solder machine according to claim 3, including a flux density sensor for monitoring the flux density and for altering the flux mixture to bring the flux to a preset density.

7. The flow solder machine according to claim 2, wherein said flux system includes at least one air knife for removing excess flux and causing the flux to enter and pass through holes in the printed circuit board.

8. The flow solder machine according to claim 7, including a pressure sensor for monitoring air from the air knives to ensure that air is being supplied through the air knives.

9. The flow solder machine according to claim 1, including a preheat system to heat each printed circuit board to an optimum temperature for flow soldering.

10. The flow solder machine according to claim 9, wherein said preheat system includes seven heating zones each zone having six infrared heating tubes that are perpendicular to the conveyor system and each of which are individually controlled by a closed-loop feedback circuit.

11. The flow solder machine according to claim 9, wherein the preheat system includes a pyrometer which monitors the top side of each printed circuit board.

12. The flow solder machine according to claim 11, wherein the pyrometer is automatically positioned with respect to the printed circuit board.

13. The flow solder machine according to claim 12, wherein a predetermined length of the printed circuit board is scanned with the pyrometer and an average topside printed circuit board temperature is calculated after which the topside temperature is corrected as necessary.

14. The flow solder machine according to claim 1, wherein the solder system includes solder level sensors and an automatic feed for the solder, and the amount of solder in the solder pot is maintained at a constant amount by the solder level sensors and the automatic solder feed.

15. The flow solder machine according to claim 14, further including a solder pump to create a solder wave in the solder pot, and that the solder pump is maintained at a constant speed.

16. The flow solder machine according to claim 1, wherein the solder pot has an immersion depth and includes a non-contact capacitance probe to adjust the immersion depth of the solder.

17. The flow solder machine according to claim 16, wherein the capacitance probe is used to determine the distance of the top surface of the solder from the probe to set the immersion depth.

18. The flow solder machine according to claim 16, wherein the immersion depth of the solder is set by moving the solder pot up or down based upon the measurement of the capacitance probe.

19. The flow solder machine according to claim 15, wherein the solder depth in the solder system is maintained at 0.60+/−0.20 inch.

20. The flow solder machine according to claim 1, wherein the conveyer system includes an encoder, a D.C. drive controller, a tachometer and a D.C. motor.

21. The flow solder machine according to claim 20, wherein the conveyer speed is maintained by measuring the speed of the D.C. motor with the tachometer and using the D.C. drive controller to compare the speed with a predetermined speed set point and adjusting the speed accordingly.

22. The flow solder machine according to claim 20, wherein the speed of the D.C. motor is encoded with the encoder.

23. The flow solder machine according to claim 1, including first, second and third computers interacting to control the flow solder machine and the process parameters of the flow solder machine.

24. The flow solder machine according to claim 23, wherein said first computer controls the flow solder machine via input and output signals from sensors and data output devices on the flow solder machine and inputs received from the second and third computers, said second computer displays animated computer graphics, alarm conditions and locations, and flow solder machine status, and the third computer sends data to the first computer including data for the actual flow solder conditions for each circuit board processed through the flow solder machine and records the actual solder conditions for each circuit board passed through the flow solder machine.

25. The flow solder machine according to claim 24, wherein the animated graphics displayed by the second computer displays the operating parameters of the flow solder machine, displays an animated representation of any malfunction or out of tolerance part of the flow solder machine, and enables a machine attendant to correct the reason for an alarm or malfunction.

26. The flow solder machine according to claim 24, wherein new process parameter recipes for circuit boards may be prepared on the third computer, and up to 10,000 recipes may be stored in the third computer.

27. A computer controlled flow solder machine for applying solder to printed circuit boards, comprising: a plurality of computers for controlling the flow solder machine and its process parameters, and displaying, on animated graphics, the process conditions existing on the flow solder machine as is under operation; a flux system for applying flux to printed circuit boards; a preheat system for preheating the printed circuit boards; a solder system including a solder pot for applying solder to the printed circuit boards; and a conveyer system for moving printed circuit boards through the flow solder machine.

28. The flow solder machine according to claim 27, wherein said flux system includes a flux wave, a non-contact sensor to detect flux wave height, and at least one flux sprayer for applying flux to the top side of the printed circuit boards being processed through the flow solder machine.

29. The flow solder machine according to claim 28, wherein said flux system includes a mixing system for preparing flux to a desired density, and a recirculation system for circulating flux through the flux system.

30. The flow solder machine according to claim 28, including a sensor for determining flux wave height.

31. The flow solder machine according to claim 28, wherein said flux system includes a mixing tank for preparing flux to a desired density, and means for determining the flux level in the mixing tank.

32. The flow solder machine according to claim 29, including a flux density sensor for monitoring the flux density and for altering the flux mixture to bring the flux to a preset density.

33. The flow solder machine according to claim 28, wherein said flux system includes at least one air knife for removing excess flux and causing the flux to enter and pass through holes in the printed circuit board.

34. The flow solder machine according to claim 33, including a pressure sensor for monitoring air from the air knives to ensure that air is being supplied through the air knives.

35. The flow solder machine according to claim 27, including a preheat system to heat each printed circuit board to an optimum temperature for flow soldering.

36. The flow solder machine according to claim 35, wherein said preheat system includes seven heating zones, each zone having six infrared heating tubes that are perpendicular to the conveyor system, and the temperature of each heating zone being individually controlled by a closed-loop feedback circuit.

37. The flow solder machine according to claim 35, wherein the preheat system includes a pyrometer which monitors the top side of each printed circuit board.

38. The flow solder machine according to claim 37, wherein the pyrometer is automatically positioned with respect to the printed circuit board.

39. The flow solder machine according to claim 38, wherein a predetermined length of the printed circuit board is scanned with the pyrometer and an average topside printed circuit board temperature is calculated after which the topside temperature is corrected as necessary.

40. The flow solder machine according to claim 27, wherein the solder systems includes solder level sensors and an automatic feed for the solder and the amount of solder in the solder pot is maintained at a constant amount by the solder level sensors and the automatic solder feed.

41. The flow solder machine according to claim 40, further including a solder pump to create a solder wave in the solder pot and that the solder pump is maintained at a constant speed.

42. The flow solder machine according to claim 27, wherein the solder pot has an immersion depth and includes a capacitance probe to adjust the immersion depth of the solder.

43. The flow solder machine according to claim 42, wherein the capacitance probe is used to determine the distance of the top surface of the solder from the probed to set the immersion depth.

44. The flow solder machine according to claim 42, wherein the immersion depth of the solder is set by moving the solder pot up or down based upon the measurement of the capacitance probe.

45. The flow solder machine according to claim 41, wherein the solder depth in the solder system is maintained at $0.60 +/- 0.20$ inch.

46. The flow solder machine according to claim 27, wherein the conveyer system includes an encoder, a D.C. drive controller, a tachometer and a D.C. motor.

47. The flow solder machine according to claim 46, wherein the conveyer speed is maintained by measuring the speed of the D.C. motor with the tachometer and using the D.C. drive controller to compare the speed with a predetermined speed set point and adjusting the speed accordingly.

48. The flow solder machine according to claim 46, wherein the speed of the D.C. motor is encoded with the encoder.

49. The flow solder machine according to claim 27, including first, second and third computers interacting to control the flow solder machine and the process parameters of the flow solder machine.

50. The flow solder machine according to claim 49, wherein said first computer controls the flow solder machine via input and output signals from sensors and data output devices on the flow solder machine and inputs received from the second and third computers, said second computer displays automated computer graphics, alarm conditions and locations, and flow solder machine status, and the third computer sends data to the first computer including data for the actual flow solder conditions for each circuit board processed through the flow solder machine and records the actual solder conditions for each circuit board passed through the flow solder machine.

51. The flow solder machine according to claim 50, wherein the animated graphics displayed by the second computer displays the operating parameters of the flow solder machine, displays an animated representation of any malfunction or out of tolerance part of the flow solder machine, and enables a machine attendant to correct the reason for an alarm of malfunction.

52. The flow solder machine according to claim 50, wherein new process parameter recipes for circuit boards may be prepared on the third computer, and up to 10,000 recipes may be stored in the third computer.

53. A computer controlled flow solder machine for applying solder to printed circuit boards, comprising: first, second and third computers for controlled the flow solder machine and its process parameters, and displaying, on animated graphics, the process conditions existing on the flow solder machine as it is under operation, the location of each circuit board as it is processed through the flow solder machine and for recording the actual process parameters of each circuit board processed through the machine; a preclean system for precleaning the circuit boards prior to flux application; a flux system for applying flux to printed circuit boards; a multi-zone preheat system for preheating the printed circuit boards and removing combustible components of flux applied by the flux system; a solder system for applying solder to the printed circuit boards at solderable elements covered by flux; and a conveyer system for moving printed circuit boards through the flow solder machine.

* * * * *